C. DAHL.
VEHICLE PROPELLING DEVICE.
APPLICATION FILED JULY 14, 1920.
1,368,610.
Patented Feb. 15, 1921.
2 SHEETS—SHEET 2.
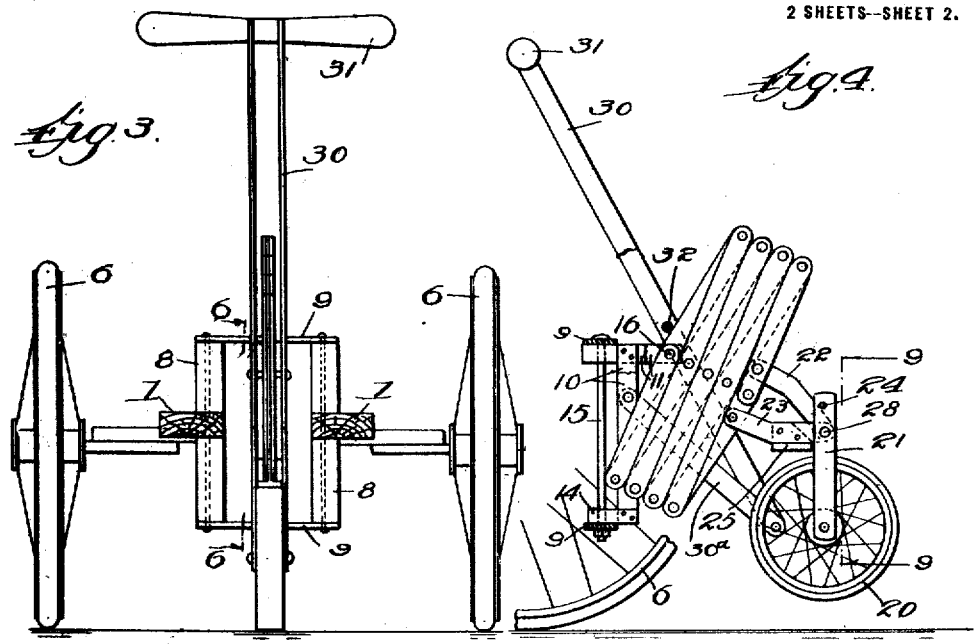
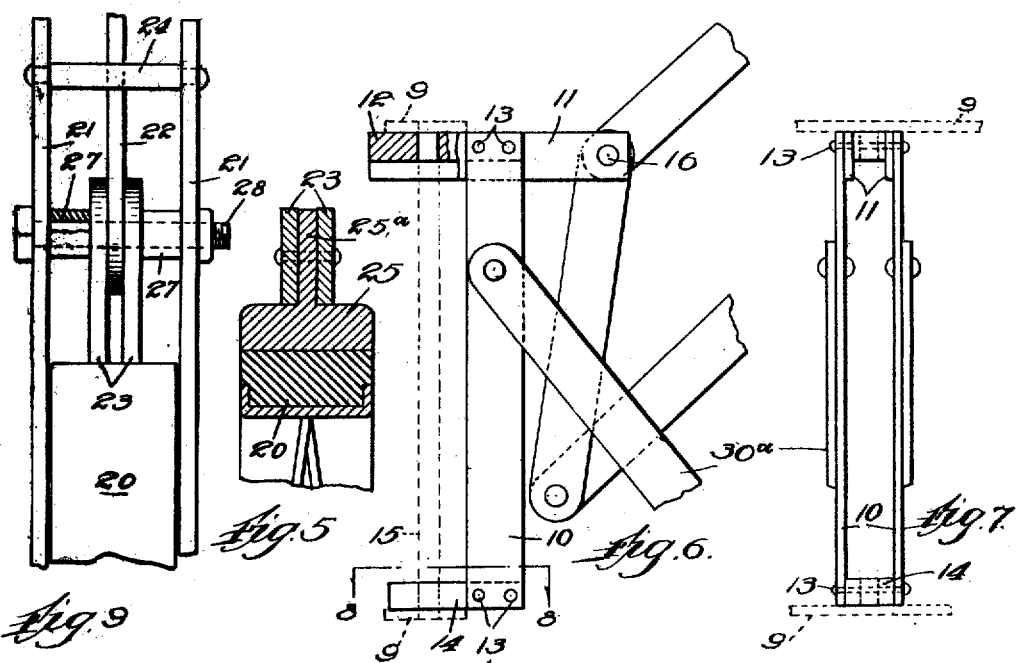
WITNESSES:
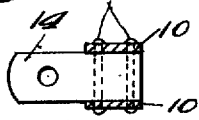
INVENTOR
Conrad Dahl,
BY Burton & Burton
ATTORNEYS

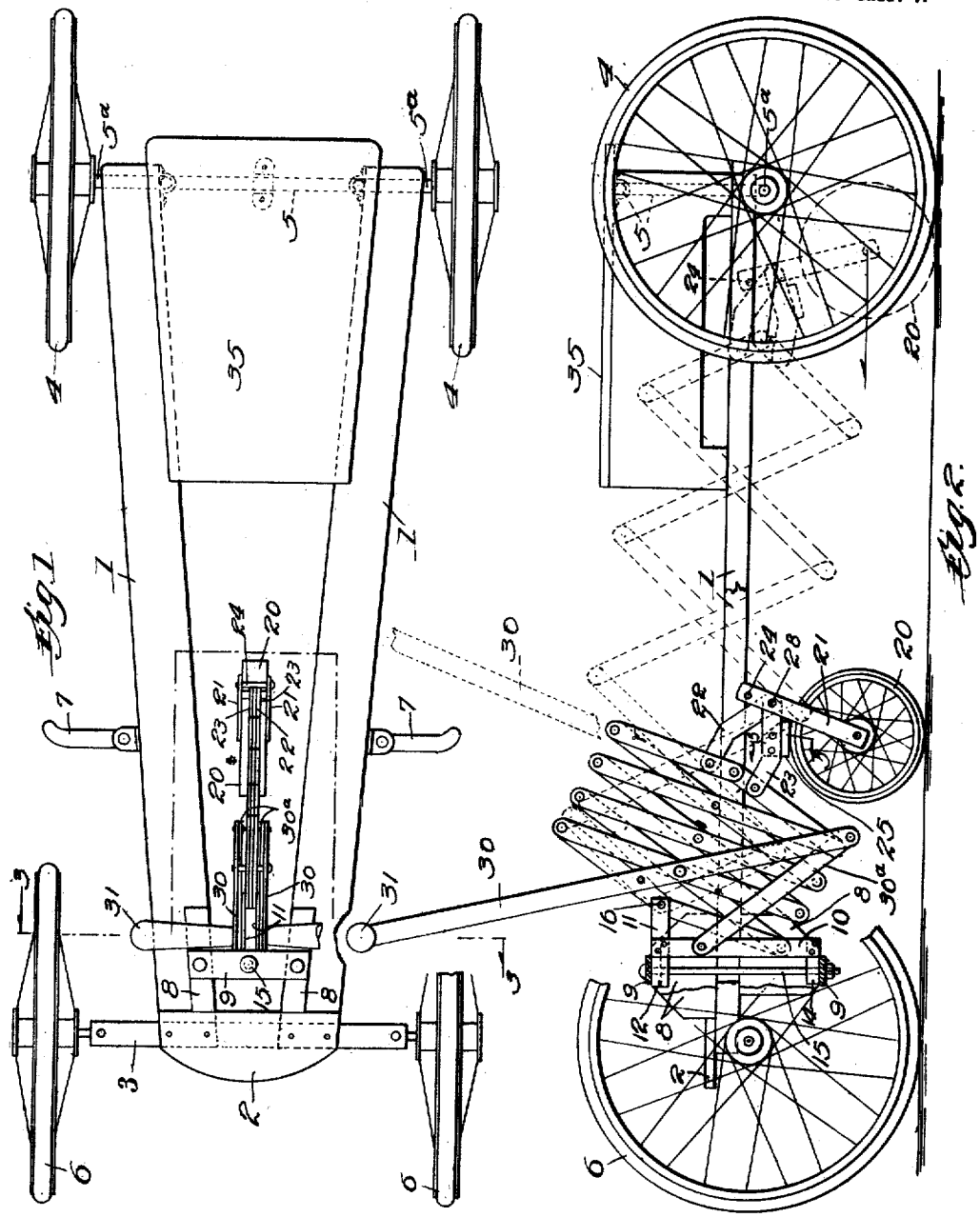

UNITED STATES PATENT OFFICE.

CONRAD DAHL, OF CHICAGO, ILLINOIS.

VEHICLE-PROPELLING DEVICE.

1,368,610.

Specification of Letters Patent.  Patented Feb. 15, 1921.

Application filed July 14, 1920. Serial No. 396,202.

*To all whom it may concern:*

Be it known that I, CONRAD DAHL, a citizen of the United States, residing at Chicago, in the county of Cook and the State of Illinois, have invented certain new and useful Improvements in Vehicle-Propelling Devices, of which the following is a specification, reference being had to the accompanying drawings, forming a part thereof.

The purpose of this invention is to provide a novel and improved mechanism for propelling a vehicle, particularly designed to be occupant-operated. It consists in the elements and features of construction shown and described, as indicated in the claims.

In the drawings:—

Figure 1 is a plan view of a structure embodying this invention, details of the steering means which are not a part of this particular invention, being omitted.

Fig. 2 is a side elevation of the same with wheels at one side removed and a part of the frame at that side broken away to avoid obstructing the view of the remainder.

Fig. 3 is a section at the line, 3, 3, on Fig. 1.

Fig. 4 is a detail view showing in side elevation the operating parts and front steering wheels in closed-up and secured position of the operating parts for carrying the vehicle.

Fig. 5 is a detail section at the line, 5, 5, on Fig. 2, showing the ground-engaging wheel locking means.

Fig. 6 is a detail section at the line 6, 6, on Fig. 3 upon a large scale.

Fig. 7 is a rear elevation of the parts shown in Fig. 6.

Fig. 8 is a section at the line, 8, 8, on Fig. 6.

Fig. 9 is a section at the line, 9, 9, on Fig. 4.

The vehicle shown in the drawings comprises a frame structure consisting of longitudinal side bars, 1, 1, divergent rearwardly, and rigidly connected together at front by a cross tie, 2, and a front axle, 3, and at the rear by the rear axle, 5, and the seat, 35, so as to make a rigid open frame having a trapezoidal opening widening from front to rear. As shown in the drawings, the vehicle is represented as a wheeled vehicle, having rear carrying wheels, 4, 4, mounted on spindles, 5ª, 5ª, of an arch axle, 5, under whose arch the operating lazy-tongs hereinafter described may protrude in its maximum extension. The front wheels, 6, 6, may be understood to be steering wheels mounted in any customary manner for this purpose, and provided with any desirable steering means not shown, but designed to be operated by steering pedals, 7, 7, fulcrumed at the outer sides of the longitudinal side bars, 1, 1, and provided with any suitable operating connections, not shown, leading to the steering wheels respectively.

At the forward end of the frame there is provided carried on the longitudinal side bars, a vertically-extended fulcrum bearing for the head hereinafter described, of the operating mechanism, said fulcrum bearing consisting of vertical cheeks, 8, 8, secured to the inner sides of the longitudinal side bars, 1, 1, respectively, and connected at their upper and lower ends by transverse tie plates, 9, 9. In these transverse tie plates there is vertically pivoted a head for the operating devices. This head consists of two vertically-positioned parallel plates, 10, 10, spaced apart and secured together at their upper ends by a fore-and-aft extending member comprising two parallel plates, 11, 11, spaced apart by an interposed block, 12, all secured together and secured to the upper ends of the plates, 10, 10, by bolts, 13, taking through all said parts. The lower ends of the plates, 10, 10, are thoroughly spaced apart and secured together by a block, 14, secured by bolts, 13, 13. The two blocks, 12 and 14, projecting forwardly from the vertical plates, 10, 10, are spaced apart vertically by the length of said plates, 10, 10, so that they fit between the two tie bars, 9, 9, of the upright fulcrum supports above described; and they serve as a means of pivoting the head to said fulcrum supports which is effected by means of a single vertical pivot bolt, 15, inserted through tie bars, 9, 9, and the intervening blocks, 12 and 14. The two plates, 11, 11, extend rearward from the upper ends of the plates, 10, 10, being at their rearwardly-extending portions spaced apart by the width of the block, 12, so that there may be entered and pivoted between them the initial pivot, 16, of a lazy-tongs or multiple-lever movement-multiplying device, which as shown in the drawings comprises five lever couples, though it may be understood, the number may be greater or less. Propulsion of the vehicle is effected by providing a ground-engaging member connected to the rear lever couple of the lazy-tongs, and means for extending the lazy-tongs rearwardly from its initial pivoted connection with the frame, (through the head above described), the ground-engaging member holding its position on the ground while the lazy-tongs is extended, thus causing that while the extension is rearwardly with respect to the vehicle frame it is forwardly with respect to the ground-engaging member, causing the frame itself to be carried forwardly along the ground. In the structure shown in the drawings, the ground-engaging member comprises a ground wheel, 20, journaled in a fork, 21, the fork being connected by links, 22 and 23, with the two lever members of the rear lever-couple of the lazy-tongs. By connecting the fork by the two links described to the two lever members of said couple, the same effect is obtained as if the connection were made to the final pivot of the lazy-tongs, and the connecting part were guided in alinement with the five middle pivots of the lazy-tongs; that is to say, the point of connection with the ground-engaging member is kept alined with said five middle pivots, or what may be called the axis of the lazy-tongs, throughout all inclination or changes of inclination of the latter. The height of the ground-engaging member from its point of engagement with the ground to the connection which, as above explained, is at all times alined with the axis of the lazy-tongs, is considerably less than the height above the ground of the point at which the initial pivot of the lazy-tongs is mounted on the bars, 11, 11; so that the lazy-tongs is normally inclined down rearward, and certain portion of its weight is added to that of the ground-engaging member for effecting engagement by gravity of said member with the ground, as necessary in order to effect the propulsion in the manner indicated. The ground wheel fork, 21, is pivotally connected with the links, 22, 23, at their own pivot joint, so that the lazy-tongs at its rear end tends to fall from a position at which the ground wheel fork is erect over the wheel axis, to lean said fork forward or rearward according to the direction in which the fork may be first inclined to the slightest extent either way from the vertical plane; and obviously it will continue to fall in the direction in which it starts until arrested by the encounter of parts moving in along the path of said fall. To effect this stoppage, and at the same time to act as a lock upon the ground-engaging wheel so as to render it an effective means for engaging the ground for propulsion, the lower of the two links, 23, carries a brake shoe, 25, positioned for coming into contact with the periphery of the ground wheel, 20, when the fork, 21, is inclined rearwardly so as to stand at a somewhat obtuse angle to the axis of the lazy-tongs as seen in Fig. 2. For actuating the lazy-tongs to extend it rearward and thereby propel the vehicle forward, there is provided an operating lever, 30, having at its upper hand a cross-bar handle, 31, and forked at its lower part (and if desired, throughout the length as shown), to stride the lazy-tongs, the two fork arms being engaged with an intermediate pivot of the lazy-tongs in the line of the axis, as shown in the drawings, the second of these pivots being thus engaged. The fork extends to a suitably low point to permit its connection by means of links, 30$^a$, 30$^a$, from the two fork arms respectively, extending up forwardly for connection at their upper forward ends to the vertical bars, 10, 10, respectively. This provision of a suspended fulcrum support for the lower end of the fork-operating lever, permits the lazy-tongs in its extension rearward to follow any path determined by the relative position of the ground-engaging wheel and the frame, as the position of the latter is determined by the ground upon which the carrying wheels ride; that is, so that without regard to irregularity of the ground along the track along which the vehicle is propelled, the ground-engaging wheel may maintain its ground engagement while the carrying wheels rest upon the ground at higher or lower position, according to the irregularities in the track. It will be observed that the pivotal connection of the initial pivot of the lazy-tongs of the frame is so much higher than its connection with the ground-engaging member (the fork, 21), that under any conditions of regularity or irregularity of a track upon which the operation of the vehicle would be reasonably practicable, the axis of the lazy-tongs will approach the horizontal from its initially front-inclined position, as the lazy-tongs is extended rearward along the vehicle, that is as the vehicle moves forward along the ground with respect to the ground engagement; and the amount of change of inclination of the lazy-tongs axis which is effected by the extension of the lazy-tongs to about one-half the distance to which it can be extended, or substantially to the position shown in dotted line in Fig. 2, is enough to bring the fork, 21,—which by reason of the engagement of the brake shoe with the ground wheel, as shown in full line in Fig. 2, cannot have its angle to the axis of the lazy-tongs reduced by the rearward extension of the lazy-tongs,—up to or past an erect position; and upon reaching this erect position, it will be seen that the fork will fall forward, as shown in dotted lines at the rear part of Fig. 2, releasing the brake from the ground wheel, leaving it free to roll on the ground, as the vehicle, under the momentum applied in the rearward thrust of the lazy-tongs upon the ground-engaging member, continues to run forward, requiring that the ground wheel should travel over the ground to avoid acting as a track brake and defeating the propulsion.

Upon the frame there is mounted a rider's seat, 35, which constitutes a hood under which the lazy-tongs is projected in its rearward extension; it being designed that the occupant operator shall sit with spread feet striding the lazy tongs at its collapsed position, and that in extension it will run back between his knees as he sits supported by the seat. This would be the normal position of the operator in any event, because it is designed that the vehicle shall be steered by means of the foot pedals, 7, at opposite sides, as above indicated.

Upon the ground wheel fork, 21, falling forward to the position shown in the rear part of the outline of Fig. 2, as above described, it is arrested and prevented from falling farther forward, as shown, by a cross pin, 24, set through the upper end of the wheel fork in position to collide with the upper link, 22, at the forwardly inclined position of the fork shown in dotted lines in Fig. 2. Upon the return rocking stroke of the operating lever, 30, the lazy-tongs will be retracted to closed position while the vehicle travels forward under the impulse of the initial propelling movement, and in this return forward movement, it will be seen that the fork, 21, is tilted up to and slightly past erect position, by the pin, 24, encountered by the upper links, 22, consequently upon the spreading of the links, 22, due to the flattening of the lazy-tongs lever couple in the collapsing movement, whereupon it will fall rearward until arrested by the lodgment of the brake shoe upon the periphery of the ground wheel as shown in full lines at the forward end of Fig. 2; and thereupon, the ground wheel being locked, will operate as a ground-engaging member, and the device is ready for repetition of the propelling movement given by the operator pulling the operating lever, 30, rearward.

The detail construction of the brake which constitutes the lock for the ground wheel, is seen in Fig. 5, the brake shoe, 25 being formed with a longitudinal rib, 25ª, which is engaged and bolted fast between the two lower links, 23, connected to the lower lever members of the rear lever-couple of the lazy-tongs.

In the lazy-tongs construction as shown, the lever members are alternately made single and double,—that is, a single bar of one member being pivoted between two bars of the next preceding members. Following out this particular method of construction, it results that the lower of the links, 23, is double,—that is, it comprises two bars between which the lower lever member of the final couple of the lazy-tongs is clasped, and the upper link, 22, is single, being itself clasped between the two bars of the upper member of said final couple; and said two links are similarly related to each other,— that is, the upper link being a single bar is embraced between the two bars of the lower link.

The ground wheel fork, 21, by reason of having its fork arms sufficiently spread to admit the ground wheel of suitable width between them, this width being greater than the three thicknesses of the bars lapped side by side at the junction of the upper and lower links, 22, has spacers, 27, 27, interposed between the two bars which constitute the fork arms at their upper part where they constitute the stem of the fork, and the bolt 28, which secures the two fork arms together engaging between them the three lapped ends of the links, 22, and 23, of the spacers, 27, serves as a pivot for connecting the link, 22, to the fork, while the bolt, 24, which extends across the space between the bars, 21, for completing the securement of the two bars rigidly together to form the stem of the bolt, serves as the pin above described for arresting the forward-falling movement of the fork arm which occurs at the extended position of the lazy tongs, as shown in the rear part of Fig. 2 and is above described.

For the purpose of adapting the entire vehicle to be lifted and carried, its most obvious use being as a child's cart of size which could be thus handled,—there is provided a removable locking pin, 32, for which a hole is provided in the operating lever at a point at which the latter crosses and extends in front of the front lever-couple of the lazy-tongs at the fully collapsed or contracted position of said lazy-tongs as seen in Fig. 4. By swinging the lever forward to this position and inserting the locking pin as seen in Fig. 4, the structure is held securely together in the most compact condition with the ground-engaging wheel lifted from the ground, and may be easily carried by hand.

I claim:—

1. A vehicle propelling device, comprising in combination with a vehicle frame, a movement multiplying multiple lever system having its initial pivot at an elevated fixed position on the vehicle frame, and trending thence rearward with freedom for up-and-down movement at its rear end; a ground-engaging member carried by the rearmost operating member of said lever system, and operating means engaging an intermediate pivot of the lever system for rearward movement of said pivot.

2. A vehicle propelling device, comprising in combination with a vehicle frame, a lazy-tongs having its initial pivot at an elevated fixed position on the vehicle frame, and trending thence rearward with freedom of up-and-down movement at its rear end; a ground-engaging member carried by the rearmost operating member of the lazy-tongs, and operating means engaging an intermediate pivot of the lazy-tongs for rearward movement of said pivot.

3. In the construction defined in claim 2 foregoing, the ground-engaging member comprising a wheel; locking means for said wheel, and means for releasing the wheel from the locking means at a certain stage in the extension of the lazy-tongs.

4. In the construction defined in claim 2 foregoing, the ground-engaging member comprising a wheel and its bearing member; means extended from the final couple of the lazy-tongs for connection with the wheel-bearing members, said wheel-bearing member being pivotally connected to said coupling; a wheel-locking device being carried by the before-mentioned parts for locking engagement with the wheel when the same is inclined up rearward from the wheel axis to the pivot of the coupling member, and for disengagement when said wheel-carrying member reaches erect position.

5. In the construction defined in claim 2 foregoing, the ground-engaging member comprising a wheel and a bearing member therefor; coupling means from the lazy-tongs to the bearing member, consisting of a link from each of the lever members of the final couple of the lazy-tongs, both links extended and pivoted at a common pivot line to the bearing member, and a wheel-locking means carried by said links for locking engagement with the wheel at the rearwardly-inclined position of the bearing member.

6. In the construction defined in claim 2 foregoing, the operating means being a lever having its lazy-tongs engagement intermediate its ends; a link which connects the lower end of the lever with the frame at a point situated to cause the link to trend up forward from its lever connection to its frame connection.

7. In the construction defined in claim 2 foregoing, a head and a vertically-extending pivot for the same on the frame, the operating means for the lazy-tongs being a lever, the lazy-tongs having its initial pivot at the upper part of said head, and a link pivoted to said head and extending down rearward, and having the lower end of the operating lever at its lower rear end.

8. In the construction defined in claim 2 foregoing, the frame comprising fore-and-aft-extending bars and cross ties connecting them rigidly, said bars being divergent from front to rear; uprights rigid with longitudinal bars, cross ties connecting said uprights at their upper and lower ends; a head vertically pivoted in said cross ties, and having its initial pivot on said head; operating means comprising a fork which strides the lazy-tongs for pivotal connection with one of the intermediate pivots of the lazy-tongs, and a pair of links connecting the lower ends of the fork arms with the head, the upper end of the forks being positioned to serve as an operating handle.

9. In the construction defined in claim 2 foregoing, the frame comprising longitudinal side bars divergent rearwardly; a vertically-extended fulcrum support at the forward part of said side bars; a head vertically pivoted in said support, the lazy-tongs having its initial pivot in said head; the operating means comprising a forked lever whose fork strides the lazy-tongs for engagement with the pivot of the latter; a swinging fulcrum support for the foot of the lever pivoted to the head; the lever being adapted at its upper end to serve as an operating handle, and a rider's seat at the rear part of the frame, formed as a hood for the path of the lazy-tongs in its extension.

10. In the construction defined in claim 2 the operating lever being forked to stride the lazy-tongs and the fork opening extending high enough to permit the lazy-tongs to pass bodily through it when the lever is swung to most collapsed position of the lazy-tongs and means for engaging the lever in front of the lazy-tongs at that position, for holding the lazy-tongs collapsed.

In testimony whereof, I have hereunto set my hand at Chicago, Illinois, this 12th day of July, 1920.

CONRAD DAHL.